(12) United States Patent
Harrison

(10) Patent No.: US 8,734,605 B2
(45) Date of Patent: May 27, 2014

(54) MANUFACTURING A COMPOSITE COMPONENT

(75) Inventor: Neil R. Harrison, South Shields (GB)

(73) Assignee: Rolls-Royce PLC, London (GB)

( * ) Notice: Subject to any disclaimer, the term of this patent is extended or adjusted under 35 U.S.C. 154(b) by 1213 days.

(21) Appl. No.: 12/591,739

(22) Filed: Nov. 30, 2009

(65) Prior Publication Data

US 2010/0189566 A1     Jul. 29, 2010

(30) Foreign Application Priority Data

Jan. 26, 2009   (GB) .................................. 0901189.1

(51) Int. Cl.
*F01D 5/28*   (2006.01)
*B32B 7/14*   (2006.01)
*B29C 45/02*   (2006.01)
*F01D 9/02*   (2006.01)

(52) U.S. Cl.
USPC ........ 156/242; 416/241 R; 428/119; 264/258; 415/200

(58) Field of Classification Search
USPC ........................................ 156/242
See application file for complete search history.

(56) References Cited

U.S. PATENT DOCUMENTS

| 4,113,910 A * | 9/1978 | Loyd ............................ 428/162 |
| 4,606,961 A | 8/1986 | Munsen et al. |
| 5,789,061 A * | 8/1998 | Campbell et al. ............. 428/119 |
| 7,198,472 B2 | 4/2007 | McMillan et al. |
| 2008/0220207 A1* | 9/2008 | Ravey .......................... 428/119 |

FOREIGN PATENT DOCUMENTS

| EP | 0 237 393 A1 | 9/1987 |
| EP | 1 184 501 A2 | 3/2002 |
| GB | 963150 A | 7/1964 |
| GB | 1 436 755 A | 5/1976 |
| JP | A-62-178321 | 8/1987 |
| JP | 03119138 A * | 5/1991 |
| JP | A-08-025386 | 1/1996 |

OTHER PUBLICATIONS

British Search Report issued in GB Application No. 0901189.1; Mailed on May 26, 2009.
British Search Report issued in GB Application No. 0901189.1; Mailed on Sep. 28, 2009.

* cited by examiner

*Primary Examiner* — Philip Tucker
*Assistant Examiner* — Vicki Wu
(74) *Attorney, Agent, or Firm* — Oliff PLC

(57) ABSTRACT

A composite component, such as an aerofoil component for a gas turbine engine, comprises a body and a platform which are formed from respective body and platform preforms. The body preform includes fibers which are directed laterally of the preform, forming a cavity in the end of the preform. The platform preform includes a projection constituting a deltoid filler which is received in the cavity. The projection includes a 3D woven structure of reinforcement fibers so that the cavity is occupied by fibers to give the platform a generally uniform volume fraction. A further platform preform fits over the body preform so that the lateral fibers are sandwiched between the platform preforms.

11 Claims, 2 Drawing Sheets

MANUFACTURING A COMPOSITE COMPONENT

This invention relates to a composite component, and to a method of manufacturing such a component. The invention is concerned particularly, although not exclusively, with the manufacture of aerofoil components, for example for gas turbine engines.

U.S. Pat. No. 7,198,472 discloses a composite aerofoil vane made up from an aerofoil preform and a platform preform which are integrated together in a suitable composite material manufacturing process. The aerofoil preform has a fibre reinforcement including reinforcement fibres which extend generally lengthwise of the preform. At one end of the preform, the fibres are folded laterally of the lengthwise direction of the aerofoil to lie over the platform preform. The outwards folding of the reinforcement fibres leaves a space in the central region of the aerofoil preform which must be filled with a pre-moulded deltoid filler, containing further reinforcement fibres, to maintain the fibre volume fraction within the finished component. Additionally, separate plies of fabric reinforcement need to be built up on the aerofoil and platform preforms. The manipulation of the deltoid filler and the additional reinforcement plies causes difficulties in the manufacturing process.

According to the present invention there is provided a method of manufacturing a composite component comprising the steps of:

(a) forming a body preform comprising reinforcement fibres which extend in a first portion in a direction having a component parallel to a first direction of the body preform, at least some of the reinforcement fibres having a second portion directed laterally of the first direction, at an extremity of the body preform, to form lateral fibres, the lateral fibres being directed away from a central region of the extremity of the body preform thereby to define a cavity in the central region, (b) forming a platform preform having a projection from a surface of the platform preform which is complementary to the cavity, (c) engaging the platform preform with the body preform with the projection disposed in the cavity and with the lateral fibres extending over the surface of the platform preform, and (d) performing a bonding process to bond the platform preform to the body preform, thereby to form the composite component with a body and a platform extending transversely of the body.

The extremity of the body preform may be an end of the body preform, if the body preform is elongate, for example is a preform for an aerofoil such as a blade or vane for a gas turbine engine. Alternatively, the extremity may be an edge if the body preform is in the form of a web, such as a web of a structural component such as a chassis member for a vehicle.

The platform preform may comprise a first one of a pair of platform preforms so that, in step (c), a second one of the pair of platform preforms is engaged with the lateral fibres on the side away from the first platform preform, thereby to sandwich the lateral fibres between the body preform and the platform preform.

The platform preform, or at least the first platform preform, may comprise a fibre reinforcement, and this fibre reinforcement may extend into the projection. This fibre reinforcement, at least in the projection, may comprise a 3D woven structure. Alternatively, the reinforcement, at least in the projection, may comprise a 2D woven structure.

The fibre reinforcement of at least one of the preforms may be impregnated with resin. The bonding process of step (d) may comprise a resin transfer moulding process.

The platform preform, or at least one of the platform preforms, may have a recess for accommodating the lateral fibres. This measure enables the resulting platform of the finished composite component to have a substantially constant thickness, at least in the region away from the junction between the body and the platform, for example at the periphery of the platform. The platform may have a substantially constant volume fraction.

Another aspect of the present invention provides a composite component comprising a body having reinforcement fibres which extend in a first portion in a direction having a component parallel to a first direction of the body, and having a second portion directed, at one extremity of the body, laterally of the first direction away from a central region of the extremity of the body, thereby to define a space in the central region, and a platform bonded to the extremity of the body, the platform having reinforcement fibres which include a 3D woven structure of reinforcement fibres which extends into the space, the reinforcement fibres of the body and the platform being embedded in a resin matrix.

The composite component may be made by a method as defined above. The body of the component may comprise an aerofoil. In one embodiment, the platform may comprise a common platform or shroud for an array of aerofoils. For the purpose of this specification, the expression "platform" is used in a general sense to denote a flat or curved structure, and in particular to embrace features at both ends of vanes or blades of gas turbine engines and similar turbo machines, such features being referred to as "platforms" or "shrouds".

An aerofoil component may comprise two or more, for example three, aerofoils extending from a common platform.

The invention is not restricted to aerofoil components. Thus, for example, the composite component may comprise a structural component, such as an elongate component, in which the body is a web and the platform is a flange extending along an edge of the web.

For a better understanding of the present invention, and to show more clearly how it may be carried into effect, reference will now be made, by way of example, to the accompanying drawings, in which.

Figure 1:
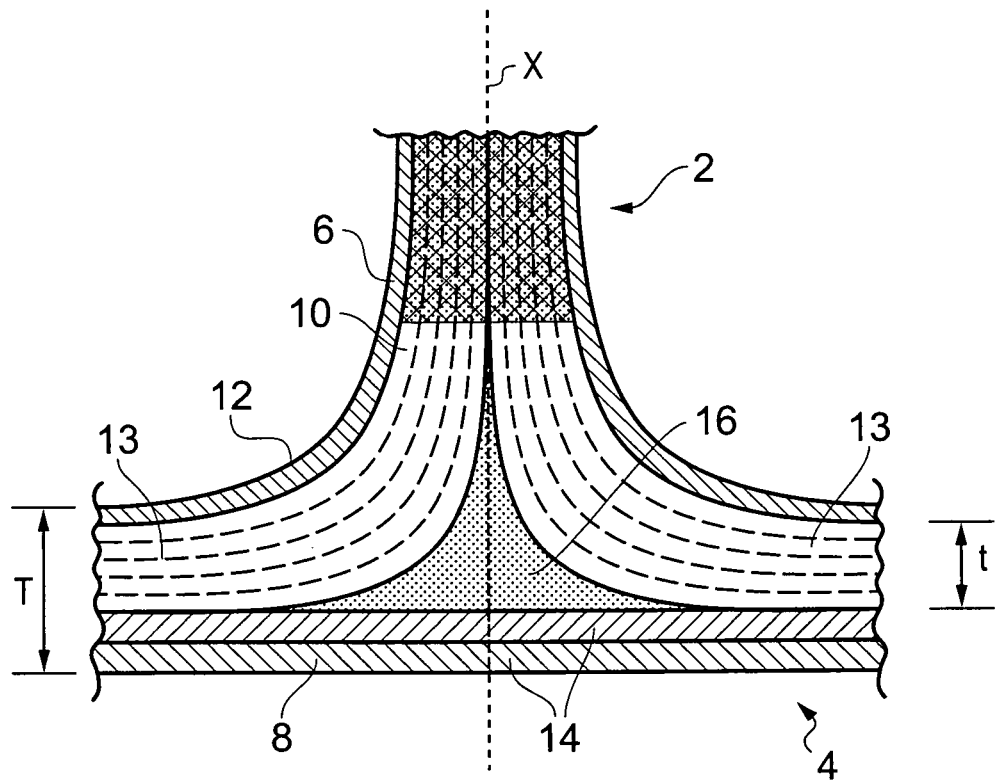
FIG. 1 (PRIOR ART) is a fragmentary sectional view of a known aerofoil component.

The aerofoil component of FIG. 1 comprises a body 2 having an aerofoil profile and a platform 4, by which the component is mounted in a gas turbine engine.

It will be appreciated that FIG. 1 shows only the region of the component which includes the junction between the body 2 and the platform 4. Both the body 2 and the platform 4 extend beyond the region of the component shown in FIG. 1.

The component is made from composite material comprising a fibre reinforcement in a resin matrix. The component is made from two preforms, namely a body preform 6 and a platform preform 8. For convenience, the preforms 6, 8 are identified with the respective features of the finished component shown in FIG. 1. In reality, the preforms are separate articles until they are integrated in the manufacturing process, and their shapes do not correspond exactly to the finished shapes of the respective features of the finished component.

The body preform 6 comprises a central reinforcement fibre structure 10 and an outer layer 12 including additional woven fibre reinforcement plies. At least some of the fibres in the structure 10 and the plies 12 are aligned with the lengthwise direction X of the body preform 6. The platform preform 8 comprises two fibre reinforcement plies 14.

It will be appreciated from FIG. 1 that the body preform 6 is splayed out, or bifurcated, at its end engaging the platform preform 8. Thus, the reinforcement fibres in the structure 10 and the plies 12 are directed laterally outwardly from a central region of the end of the body preform 6 as indicated in the drawings as lateral fibres 13. These outwardly directed lateral fibres 13 lie over the platform preform 8.

It will be appreciated that the folding out of the fibres in the body preform 6 forms a cavity 16 in the end face of the body preform 6. If this cavity is left unfilled, the subsequent manufacturing process, for example a resin transfer moulding process, will result in resin entering the cavity 16 and subsequently curing, to form an internal region of the component which lacks any fibre reinforcement. In order to avoid this, a separate component, in the form of a deltoid filler, is formed with a shape complementary to the cavity 16. The deltoid filler incorporates fibre reinforcement so that, in the resin transfer moulding process, the volume fraction within the component is generally uniform. By "volume fraction" is meant the proportion of the overall volume of the component which is occupied by the reinforcement fibres.

Furthermore, the thickness t of the layer of reinforcement fibres of the structure 10 and the plies 12 varies in the chordwise direction of the aerofoil body 2. It is desirable for the platform 4 to have a generally uniform cross-section, and therefore a generally uniform total thickness T at least in the regions away from the fillet at the junction between the aerofoil 2 and the platform 4. In order to achieve this, it is necessary to apply additional plies of woven reinforcement fibres to the upper surface, as viewed in FIG. 1, in order to compensate for reduced thickness t where there are fewer reinforcement fibres in the structure 10.

It is difficult to position these additional plies accurately, and to maintain them in position during the resin transfer moulding process. There is no positive location for the plies. Consequently, the resulting product may have resin rich regions in highly stressed areas, which can lead to premature failure. The deltoid filler in the space 16 has a complex shape, and is very small. Consequently, moulding of the deltoid filler is complex, and movement of the reinforcement fibres in the moulding process can cause it to break up leading to further resin rich areas. Since these resin rich areas are prone to arise in the fillet region of the component (ie the junction between the body 2 and the platform 4), where stresses in operation are often highest, there is significant potential for premature failure.

The present invention provides a modified method of manufacturing such components, as explained below with reference to FIGS. 2 and 3. Reference numbers used in FIG. 1 are used also in FIGS. 2 and 3 to designate similar features. Also, where appropriate, the same reference number is used to designate both a feature and a preform, or part of a preform, which forms the feature.

Figure 2:
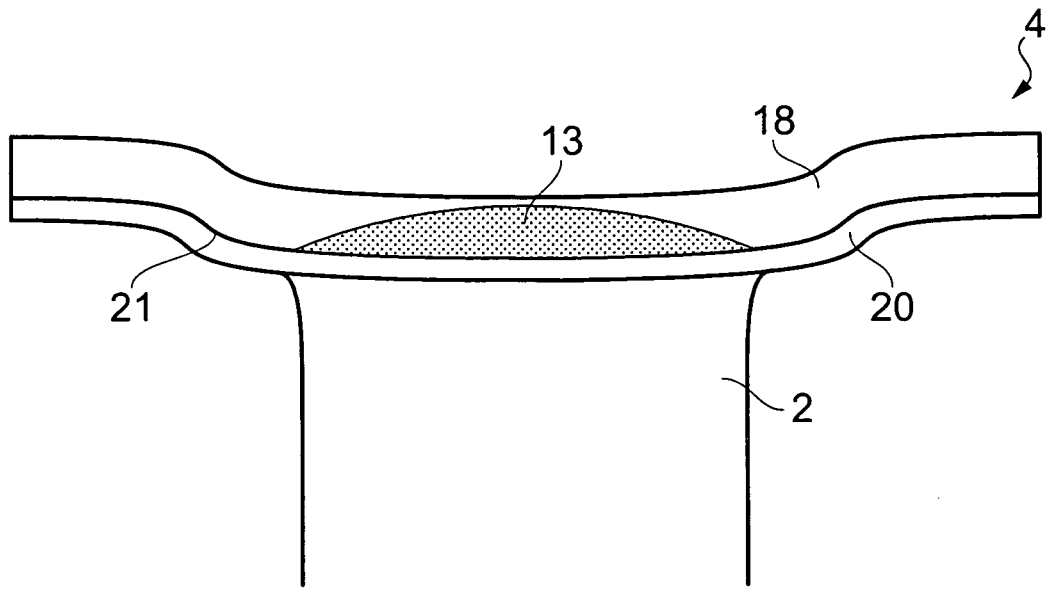
FIG. 2 is a partial side view of an aerofoil component in accordance with the present invention.

With reference to FIG. 2, the aerofoil component comprises the aerofoil 2 and platform 4 as before. However, the platform 4 is formed from two platform preforms 18, which extend on opposite sides of the laterally directed fibres of the fibre reinforcement structure 10. The platform preforms 18, 20 are bonded together at a bond line 21, and the lateral fibres 13 are sandwiched between them.

Figure 3:
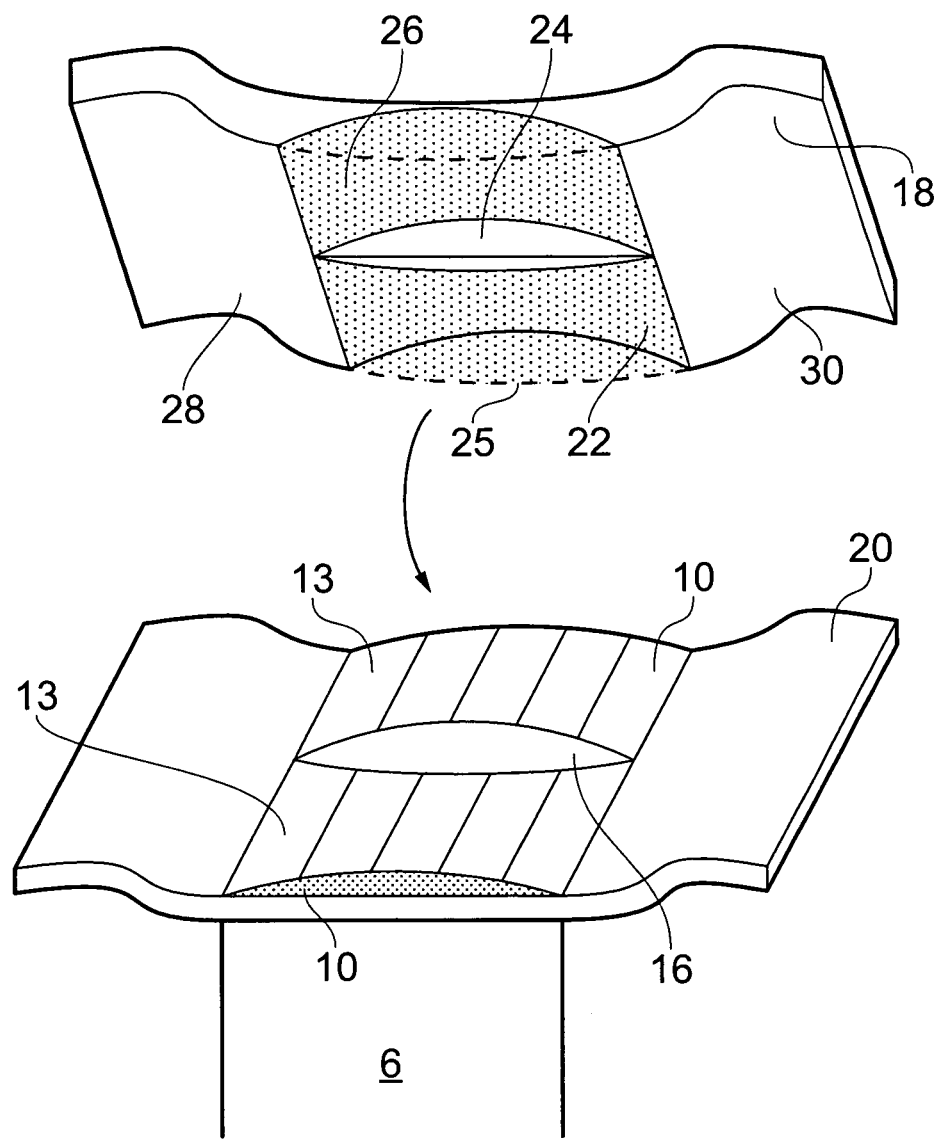
FIG. 3 is a view of a body preform and platform preforms during manufacture of the component of FIG. 2.

FIG. 3 shows the preforms 2, 18, 20 immediately prior to assembly together in a resin transfer mould (the mould is not shown). The platform preform 20 has an opening (not shown) which enables it to be passed along the aerofoil, or body, preform 2 to engage the lower surface of the bundle of lateral fibres 13, in the orientation shown in FIG. 3. The other preform 18 has a recess 22 for accommodating the lateral fibres 13, and a deltoid projection 24 which has a shape complementary to that of the cavity 16.

It will be appreciated that the preforms 2, 18 and 20 locate positively with respect to one another, so that relative movement during the resin transfer moulding process is inhibited. This location is achieved by engagement between the preform 20 and the aerofoil body preform 6 which passes through it, and by location of the projection 24 in the cavity 16.

The platform preform 18 having the projection 24 comprises a reinforcement fibre structure impregnated with a curable resin. The structure is a 3D woven structure in the projection 24, but is a 2D structure in the remaining parts of the preform 20. By "2D structure" is meant a woven or nonwoven structure of conventional textile form, in which the individual fibres lie substantially in a common plane. A "3D structure" is one in which fibres extend in directions having three orthogonal components. The region of the preform 18 comprising the 2D structure may comprise several woven fibre plies laid one above the other.

As shown in FIG. 3, the 2D woven structure of the preform 18 may have its full thickness (ie may be made up of the same number of plies) over its full extent, so as to include a region 26 which entirely surrounds the 3D fibre structure of the projection 24. The 2D woven structure thus provides a substantially continuous surface 25 over the preform 18 between lateral ends 28, 30. The additional material 26 is subsequently removed by a suitable operation to expose the projection 24 and to form the recess 22, either before or after the fibre reinforcement is impregnated with resin.

The other platform preform 20 also comprises a resin-impregnated reinforcement fibre structure formed, like the preform 18 apart from the projection 24, from woven 2D plies laid one above the other.

It will be appreciated that the present invention provides a platform 4 assembled from two preforms 18, 20, so avoiding the hand lay up of individual plies required in the manufacture of the aerofoil component described with reference to FIG. 1. Also, because the projection 24 is an integral part of the platform preform 18, there is no requirement for a separate deltoid filler to occupy the cavity 16. The mating faces at the bond line 21 of the preforms 18, 20 conform to those of the aerofoil preform 2 in such a way as to provide a substantially constant cross-section to the platform 4. The filled space corresponding to the cavity 16 contains the 3D woven reinforcement fibres of the projection 24, so that a uniform volume fraction is achieved throughout the platform 4, and the rest of the component. Since the function of the deltoid filler is performed by the projection 24, integrated with the platform preform 18, the possibility of deformation of the aerofoil fillet profiles is eliminated, and the intended ply directions and structure can be maintained. The positive location between the preforms 2, 18, 20 allows increased repeatability of the resin transfer moulding process, so reducing manufacturing time and cost, whilst improving quality and reliability. It will also assist in automation of the assembly and construction process, if desired.

Although the invention has been described with reference to an aerofoil component comprising a platform 4 provided with a single aerofoil 2, it is possible for two or more aerofoils 2 to be moulded with a single platform 4. Alternatively a platform 4 may be provided at either end of an aerofoil 2, forming sections of a hub and casing, each platform 4 having a projection 24 corresponding to a cavity 16 in the body preform 6. Furthermore, the ability to provide a composite aerofoil component with an accurately moulded platform 4 enables the component to be secured, for example to an engine casing, by a metallic fixing method on a large scale production basis.

If the configuration of the component is such that the laterally directed fibres 13 extend over the entire platform 4, it may be possible to dispense with the platform preform 20, the function of this preform being accomplished by the laterally directed part of the aerofoil preform 2.

The manufacturing technique described with reference to FIGS. 2 and 3 could be applied to the manufacture of components other than aerofoil components. For example, the same technique could be used to form an "I" beam structure for structural purposes for example in vehicle chassis sections. Also, while the invention has been described with reference to a component having a platform 4 at one end only, the same technique could be used to provide a platform, for example for forming a shroud, at the other end of the component, for example in the manufacture of a composite blisk (bladed disc) for use in devices such as ship's thrusters, or tidal wave generators.

The invention claimed is:

1. A method of manufacturing a composite component comprising:

forming a body preform comprising reinforcement fibres which extend in a first portion in a direction having a component parallel to a first direction of the body preform, at least some of the reinforcement fibres having a second portion directed laterally of the first direction, at an extremity of the body preform, to form lateral fibres, the lateral fibres being directed away from a central region of extremity of the body preform thereby to define a cavity in the central region of the extremity of the body preform;

forming a first platform preform disposed at the extremity of the body preform such that the lateral fibres interface with a surface of the first platform preform;

forming a second platform preform having a projection from a surface of the second platform preform which is complementary to the cavity;

engaging the second platform preform with the body preform which passes through the first platform preform and by positively locating the projection disposed in the cavity and with the lateral fibres extending over the surface of the second platform preform, and performing a bonding process to bond the second platform preform (i) to the body preform and (ii) to the first platform preform, thereby to form the composite component with a body and a platform extending transversely of the body.

2. A method as claimed in claim 1, wherein the lateral fibres are sandwiched between the first platform preform and the second platform preform.

3. A method as claimed in claim 2, in which at least the first platform preform comprises a fibre reinforcement.

4. A method as claimed in claim 3, in which the fibre reinforcement extends into the projection.

5. A method as claimed in claim 4, in which the fibre reinforcement, at least in the projection, comprises a 3D woven structure.

6. A method as claimed in claim 4, in which the fibre reinforcement, at least in the projection, comprises a 2D structure.

7. A method as claimed in claim 1, in which the fibre reinforcement of at least one of the preforms is impregnated with resin.

8. A method as claimed in claim 1, in which the bonding process comprises a resin transfer moulding process.

9. A method as claimed in claim 2, in which at least one of the platform preforms has a recess for accommodating the lateral fibres.

10. A method as claimed in claim 1, in which the platform of the finished composite component has a substantially constant thickness, at least in a region other than a junction between the body and the platform.

11. A method as claimed in claim 1, in which the platform of the finished composite component has a substantially constant volume fraction.

* * * * *